United States Patent [19]

Spargo

[11] 3,964,838

[45] June 22, 1976

[54] BALANCED AIRFLOW CONTROL VALVE FOR HELICOPTER BLADE

[76] Inventor: John D. Spargo, 1511 Riverdale Drive, Annapolis, Md. 21401

[22] Filed: Sept. 24, 1973

[21] Appl. No.: 400,108

[52] U.S. Cl. .............................. 416/20 R; 416/90 A
[51] Int. Cl.² ......................................... B64C 27/18
[58] Field of Search ...................... 416/20, 90, 90 A

[56]  References Cited
UNITED STATES PATENTS

| | | | |
|---|---|---|---|
| 2,372,030 | 3/1945 | Stalker | 416/20 |
| 2,457,936 | 1/1949 | Stalker | 416/90 A X |
| 2,493,041 | 1/1950 | Stalker | 416/20 |
| 3,139,936 | 7/1964 | Davidson et al. | 416/20 |
| 3,524,711 | 8/1970 | Cheeseman et al. | 416/20 |

FOREIGN PATENTS OR APPLICATIONS

| | | | |
|---|---|---|---|
| 1,270,225 | 7/1961 | France | 416/20 |

*Primary Examiner*—Everette A. Powell, Jr.
*Attorney, Agent, or Firm*—R. S. Sciascia; Q. E. Hodges

[57]  ABSTRACT

An airflow control valve for a circulation control rotor helicopter blade wherein the airflow path is equally distributed about the closure element so as to prevent the generation of unbalanced pressure forces.

6 Claims, 3 Drawing Figures

U.S. Patent   June 22, 1976   3,964,838
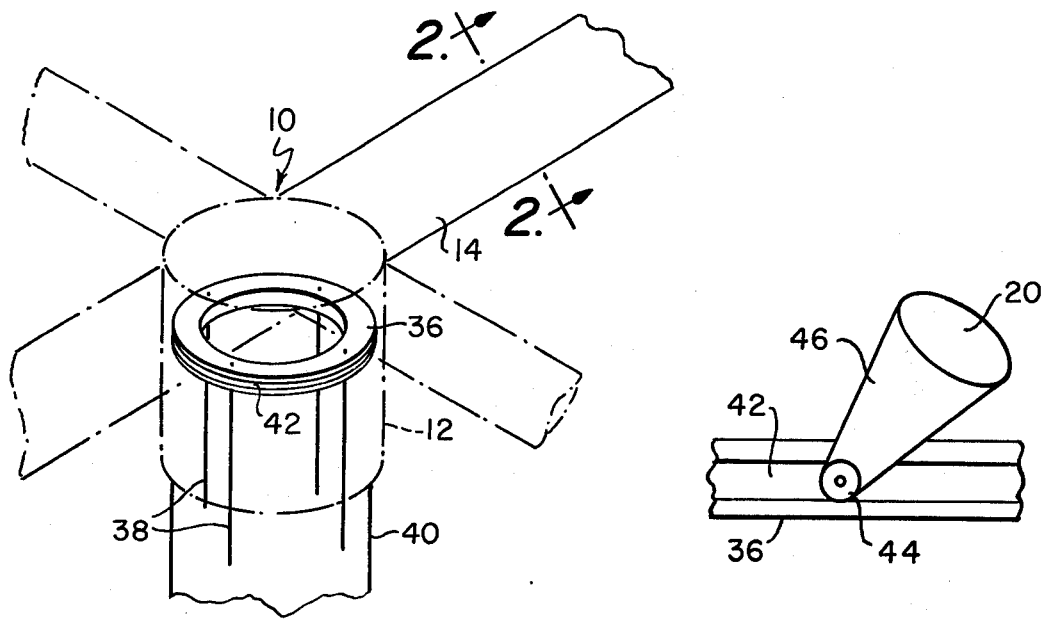
FIG. 1.
FIG. 3.
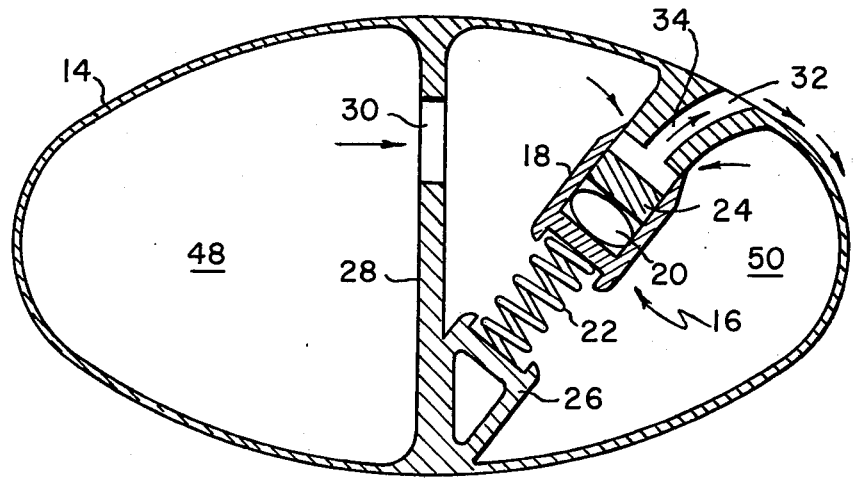
FIG. 2.

BALANCED AIRFLOW CONTROL VALVE FOR HELICOPTER BLADE

The invention described herein may be manufactured and used by or for the Government of the United States of America for governmental purposes without the payment of any royalties thereon or therefor.

BACKGROUND OF THE INVENTION

The present invention relates to the field of circulation control rotor (CCR) helicopters. Briefly, a CCR helicopter is one wherein the blades are rigidly fixed to the hub and lift is controlled by controlling the circulation of air around each blade (see U.S. Pat. No. 3,713,750). The primary advantage of a CCR helicopter is the reduction of weight of the entire rotor and reduction in number of moving parts associated with the blades; both of these result from the fact that the lift of each blade is modified by changing the circulation of air around it rather than by changing its angle of attack. The resulting rotor is lighter in weight, allowing a greater payload for the craft, and more reliable. CCR helicopters, however require a valve that will direct pulses of air into the rotor blades at a rate that does not vary appreciably with respect to the rate of rotation of the rotor. For this reason, most CCR valves are mechanically operated by a cam or other means on the rotor shaft; the air valves are thereby automatically opened at the proper azimuthal position of the rotor.

There are two main types of valves; those that are entirely within the hub, and those that are within the blades (except for the actuating mechanism, which is within the hub). Each type has advantages and disadvantages; a valve that is entirely within the hub is subjected to very low centrifugal forces and is quite compact, but this type of valve does not distribute lift control air (or other fluid) evenly along the length of the blade. That is, when a pulse of air is directed into the blade some of it immediately goes out through that part of the circulation control slot nearest the hub; this reduces the air pressure within the blade, so that less air goes out through the next part of the slot. The net result of this is an uneven airflow distribution pattern with a maximum at the hub and a minimum at the tip. A valve that extends the length of the slot in the blade solves the problem of uneven air distribution, but introduces problems due to centrifugal forces and to forces developed by unbalanced pressures on the operating part of the valve. An example of this latter would be a valve wherein the closure element is a flat plate that covers the circulation control slot along its entire length; the plate is hinged along one side, and is rotated about the hinge to uncover the slot. The unbalanced pressure force on this plate is the pressure on the inside (or plenum) surface of the plate minus the pressure on the outside (or slot) surface of the plate multiplied by the area of the slot; since the blade may be quite long, the area and hence unbalanced force may be quite large. What is needed, therefore, is a valve that extends the length of the blade but which is designed to overcome the problems due to unbalanced pressure forces on the closure element.

SUMMARY OF THE INVENTION

Briefly, the present invention is a valve for a CCR blade which extends the length of the blade. The closure element is a U-shaped member that is spring biased to a closed position, and opened by a swash plate and follower assembly in the hub. The two legs of the "U" straddle the entrance to the circulation control slot; when the closure element is reciprocated to its closed position air pressure acts on opposite legs of the "U" in opposite directions, thereby preventing the generation of forces due to unbalanced pressures.

OBJECTS OF THE INVENTION

Accordingly, it is an object of the present invention to provide a valve for a CCR blade which extends the length of the blade.

It is a further object of the present invention to provide a valve for a CCR blade wherein forces due to unbalanced pressures are not generated.

It is a further object of the present invention to provide a valve for a CCR blade wherein the closure element is reciprocated by means of a swash plate and follower mechanism.

Other objects and advantages of the present invention will be apparent from the following specification and accompanying drawings.

BRIEF DESCRIPTION OF THE DRAWINGS

FIG. 1 shows a partly sectional view of a helicopter rotor according to the present invention.

FIG. 2 is taken along line 2—2 of FIG. 1.

FIG. 3 shows the swash plate and follower mechanism.

DESCRIPTION OF THE PREFERRED EMBODIMENT

FIG. 1 shows a helicopter rotor 10 which incorporates the present invention. Rotor hub 12 is shown as having four blades 14 attached thereto; however, it is to be understood that any number of blades may be utilized in a rotor which incorporates the present invention.

FIG. 2 is a cross-section of one of blades 14 showing valve assembly 16 within blades 14. Valve assembly 16 comprises U-shaped member 18, cam 20, and spring 22. U-shaped member 18 straddles guide 24, which causes U-shaped member 18 to reciprocate in its proper path. Guide 24 is attached to the structure defining channel 34 by means of struts spaced along its length. One end of spring 22 bears against the bottom of U-shaped member 18; the other end rests against pedestal 26 which can be an integral part of spar 28 as shown. Spring 22 is one of a series of springs placed along pedestal 26; the number and strength of the springs are determined by the requirements of the individual design. Spar 28 has a series of holes 30 through it for the passage of air as will be explained later.

The contour of cam 20 is shown as being approximately elliptical; its actual profile, however, will depend on the application since cam 20 determines the amount of air that flows each time that valve 16 is opened.

Blade 14 has on its surface slot 32 through which circulation control air is ejected; slot 32 is fed by channel 34, the entrance to which is controlled by valve 16.

The valve of the present invention is controlled by a swash plate as shown in FIG. 1. The swash plate of the present invention is basically the same as those which are old in the art; it is comprised of an annular member 36 whose position can be adjusted by means of extensible members 38. Swash plate 36 can be translated axially or can be set at an angle with respect to shaft 40, as is well known in the art.

Swash plate 36 has a groove or channel 42 around its outer circumference. Follower 44, which is attached to one end of crank arm 46, rides in groove 42. The other end of crank arm 46 is rigidly attached to the hub end of cam 20. Crank arm 46 can be either rigidly or rotatably attached to follower 44 as will be explained later.

Operation of the valve is as follows: Rotor assembly 10 is caused to rotate by means not shown. Air or other lift control fluid comes up within shaft 40, and into plenums 48 and 50 of hollow blades 14. Holes 30 allow communication between plenums 48 and 50. The admission of air to channel 34 is controlled by U-shaped member 18, which is reciprocated by cam 20. When valve 16 is fully closed as shown in FIG. 2, the force on one leg of U-shaped member 18 due to the higher pressure within plenum 50 is counterbalanced by the same pressure acting on the same area of the opposite leg of U shaped member 18 which produces a force in the opposite direction. Thus the forces due to pressure cancel each other out, and the only force required to be overcome is that due to spring 22. Obviously, then, operation of valve 16 is not influenced by the level of the pressure within plenum 50 or the ambient air pressure existing in channel 34. Since the direction of motion of U-shaped member 18 is perpendicular to the direction of the centrifugal stresses exerted on the blade due to its rotation, operation of the valve is likewise not affected by the speed of rotation of the rotor.

When swash plate 36 is horizontal, follower 44 will travel in a horizontal plane around it. If one edge of swash plate 36 is elevated, when follower 44 approaches the elevated point it will be forced to rise up; however, since cam 20, which is attached to follower 40 by means of crank arm 46, cannot move up or down but can merely rotate, follower 46 will therefore cause cam 20 to rotate. As cam 20 rotates, U-shaped member 18 is reciprocated toward pedestal 26; this allows air to flow into channel 34 from both sides of U-shaped member 18. When follower 44 passes the point of peak height of swash plate 36 and begins to follow the downward sloping part, cam 20 will be rotated back to its initial position, and spring 22 will force U-shaped member 18 back to the closed position. Crank arm 46 can be rotatably connected to follower 44; alternatively, crank arm 46 can be rigidly connected to follower 44, and then crank arm 46 and follower 44 will rotate as a unit with respect to swash plate 36.

The amount of lift developed by a CCR helicopter is determined by the amount of lift control air that comes out of slots 32. If swash plate 36 is translated horizontally upward, crank arm 46 of each blade will be rotated through an equal angle and each valve 16 will be opened an equal amount; the rotor will thus develop collective lift, but no cyclic lift. Cyclic lift is developed by elevating that portion of swash plate 36 which corresponds to the azimuthal position at which cyclic lift is desired. When each blade passes this point, its follower 44 and crank arm 46 will be rotated a maximum amount which will open its valve 16 a maximum at that point. Thus the rotor will then develop cyclic lift as well as collective lift.

When swash plate 36 is held stationary, pulses of air will be produced at only one frequency. However, in order to spread the lift out over the full rotor disc and to counteract certain vibrations, it is desirable to generate pulses of air at harmonics of the primary frequency. In the rotor of the present invention this is done by making swash plate 36 and its associated actuators rotate independently of shaft 40. The swash plate assembly would be geared to the rotor assembly to rotate at integral multiples of the rotor's frequency, both in the same direction and in the opposite direction. In this manner each follower 44 would pass the high point of swash plate 36 more than once for each revolution of that particular rotor blade; the air pulses would then be produced at the primary frequency and at one or more harmonics of that frequency. Obviously many modifications and variations of the present invention are possible in the light of the above teachings. It is therefore to be understood that within the scope of the appended claims the invention may be practiced otherwise than as specifically described.

What is claimed is:
1. A hollow airfoil;
   a fluid passage means longitudinally of the surface of said airfoil and communicating with its interior;
   said passage means including opposed interior openings along its length and a guide member, and fluid pressure balanced valve means;
   said valve means including an U-shaped member slidable axially of said passage means;
   means controlling operation of said U-shaped member for controlling flow through said passage means.
2. An assembly as in claim 1 including means for reciprocating said generally U-shaped member into and out of sealing relationship with said fluid passage means.
3. An assembly as in claim 2 wherein said means for reciprocating said generally U-shaped member comprises a cam.
4. An assembly as in claim 3 including means to bias said generally U-shaped member against the action of said cam.
5. An assembly as in claim 3 including means at one end of said airfoil for actuating said cam.
6. An assembly as in claim 5 wherein said means for actuating said cam comprises a swash plate and follower assembly connected to rotate said cam.

* * * * *